(12) United States Patent
Nagathil et al.

(10) Patent No.: US 8,659,415 B2
(45) Date of Patent: Feb. 25, 2014

(54) ALARM MANAGEMENT

(75) Inventors: Roopesh Bhaskaran Nagathil, Smyrna, GA (US); Rahul Chadha, Marietta, GA (US); Rodel Belen Rivera, Jr., Chesapeake, VA (US); Prashant Ramkrishna Gawde, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 13/184,205

(22) Filed: Jul. 15, 2011

(65) Prior Publication Data

US 2013/0015967 A1    Jan. 17, 2013

(51) Int. Cl.
*G08B 29/00* (2006.01)

(52) U.S. Cl.
USPC ............... 340/506; 340/539.1; 340/573.1

(58) Field of Classification Search
USPC ............. 340/506, 603, 627–629, 309.16, 340/286.01, 573.1, 539.1, 531, 568.1, 340/572.1, 572.4, 541, 565–566
See application file for complete search history.

(56) References Cited

U.S. PATENT DOCUMENTS

| | | | |
|---|---|---|---|
| 4,726,302 A | 2/1988 | Hein et al. | |
| 4,779,412 A | 10/1988 | Deinert | |
| 5,139,757 A | 8/1992 | Topsoe | |
| 5,449,495 A | 9/1995 | Goto | |
| 5,516,497 A | 5/1996 | Speronello | |
| 5,527,755 A | 6/1996 | Wenski | |
| 5,576,970 A | 11/1996 | Goto | |
| 5,603,909 A * | 2/1997 | Varner et al. | 423/239.1 |
| 5,660,799 A | 8/1997 | Motai | |
| 5,906,803 A | 5/1999 | Leppalahti | |
| 5,912,198 A | 6/1999 | Feitelberg | |
| 6,098,011 A | 8/2000 | Scott | |
| 6,264,905 B1 | 7/2001 | Spokoyny | |
| 6,282,880 B1 | 9/2001 | Wallace | |
| 6,620,393 B2 | 9/2003 | Spokoyny | |
| 6,690,274 B1 | 2/2004 | Bristol | |
| 6,882,929 B2 | 4/2005 | Liang | |
| 6,973,508 B2 | 12/2005 | Shepard | |
| 6,981,368 B2 | 1/2006 | van Nieuwstadt | |
| 6,993,900 B2 | 2/2006 | Upadhyay | |
| 7,093,427 B2 | 8/2006 | van Nieuwstadt | |
| 7,182,927 B2 | 2/2007 | Tran | |
| 7,272,531 B2 | 9/2007 | Kavaklioglu | |

(Continued)

FOREIGN PATENT DOCUMENTS

| | | |
|---|---|---|
| DE | 69309874 | 6/1994 |
| DE | 19618384 | 11/1997 |

(Continued)

*Primary Examiner* — Daniel Previl
(74) *Attorney, Agent, or Firm* — Sutherland Asbill & Brennan LLP

(57) ABSTRACT

This disclosure describes systems and methods for alarm management. In some embodiments, data associated with a parameter of an asset may be received from an asset and stored in memory. An impact value may be determined for the parameter based at least in part on a rule set. The impact value may be a numeric value associated with the asset and determined based at least in part on a Bayesian belief network (BBN) rule set, a fuzzy logic rule set, or a combination thereof. The impact value may be analyzed based at least in part on an escalation value rule set. In response to analyzing the impact value, the impact value may be prepared for presentation.

20 Claims, 3 Drawing Sheets

(56) References Cited

U.S. PATENT DOCUMENTS

| | | | |
|---|---|---|---|
| 7,323,036 | B2 | 1/2008 | Boyden |
| 7,381,389 | B2 | 6/2008 | Harada |
| 7,390,471 | B2 | 6/2008 | Sobolevskiy |
| 7,393,511 | B2 | 7/2008 | Tran |
| 7,396,517 | B2 | 7/2008 | Lee |
| 2007/0297963 | A1 | 12/2007 | Cochran |
| 2008/0112870 | A1 | 5/2008 | Moini |
| 2010/0179833 | A1* | 7/2010 | Roizen et al. ............... 705/3 |
| 2010/0289644 | A1* | 11/2010 | Slavin et al. ............. 340/568.1 |
| 2011/0314148 | A1* | 12/2011 | Petersen et al. ............ 709/224 |
| 2012/0320201 | A1* | 12/2012 | Boghossian et al. ......... 348/143 |

FOREIGN PATENT DOCUMENTS

| | | |
|---|---|---|
| DE | 19636747 | 3/1998 |
| DE | 19851041 | 12/1999 |
| EP | 0604236 | 6/1994 |
| EP | 0806236 | 11/1997 |
| EP | 1005894 | 6/2000 |
| EP | 1625883 | 2/2006 |
| WO | WO2004048852 | 3/1998 |

* cited by examiner

ALARM MANAGEMENT

FIELD OF THE INVENTION

Embodiments of the invention relate generally to alarm management, and more particularly, to managing alarms of monitored equipment or assets, such as equipment of a power plant.

BACKGROUND OF THE INVENTION

Remote and/or local monitoring of equipment, such as turbines and/or other power plant equipment requires receiving and responding to a multitude of alarms. Often times, hundreds of false, non-critical, and/or non-value-added alarms may be triggered and/or received in a given time period, causing what is called an alarm flood. Determining when and how often to alert an equipment operator about an impending issue using an alarm is a constant concern especially in light of persistent alarm floods resulting in loss of critical equipment support. Finding ways to allow continued equipment health monitoring while not being overloaded with unnecessary alarms continues to be a priority.

BRIEF DESCRIPTION OF THE INVENTION

Some or all of the above needs and/or problems may be addressed by certain embodiments of the invention. According to one embodiment of the invention, there is disclosed a system operable to receive data associated with a parameter of an asset, store the data in memory and/or on a storage device, determine an impact value for the parameter based at least in part on a rule set, and prepare the impact value for presentation.

According to another embodiment of the invention, there is disclosed a method for receiving data associated with a parameter of an asset, storing the data in memory and/or on a storage device, determining an impact value for the parameter based at least in part on a rule set, and preparing the impact value for presentation.

Further, according to another embodiment of the invention, there is disclosed one or more computer-readable media storing instructions that, when executed by at least one processor, configure the at least one processor to perform operations for receiving data associated with a parameter of an asset, storing the data in memory, determining an impact value for the parameter based at least in part on a rule set, determining an alarm escalation value for eliminating impact values below a predefined threshold, and preparing the impact value for presentation.

Other embodiments, systems, methods, aspects, and features of the invention will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The use of the same reference numbers in different figures indicates similar or identical items.

DETAILED DESCRIPTION OF THE INVENTION

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the invention are directed to, among other things, a system for managing alarms of monitored assets. Monitored assets may include any piece or type of equipment utilized in conjunction with providing electricity or any other service, such as, but not limited to, turbines, deaerators, boilers, feeders, blowdown equipment, generators, compressors, and the like. As an overview, assets may be monitored remotely or locally. That is, signals from the assets may be collected and analyzed by computing devices that monitor the assets at local locations, or the signals may be collected and analyzed by computing devices that monitor from afar. Either way, alarms may be generated as a method of notifying operators of impending issues, potential maintenance requirements, or any other value-added objective set forth by the system design or operator of the asset or power plant.

In some instances, bayesian belief network (BBN) rule sets and/or fuzzy logic rule sets may be used to generate a numerical value for impact. An impact value may be a financial value of an asset, an outage duration, or any other value that pertains to the monitored asset. Additionally, the impact value may be a function of a possibility of failure of the asset, a possible impact of failure of the asset, or any other factor related to the potential failure of the asset. Once the impact value is determined, the value may be passed through an alarm escalation rule set where values above a certain threshold may be stored, processed, prepared for presentation, viewed using an alarm viewing tool, and/or passed on to an operator. The alarms that have made it through both the BBN and/or fuzzy logic rule sets as well as the escalation rule sets may then be prioritized and further prepared for display, or displayed.

Figure 1:
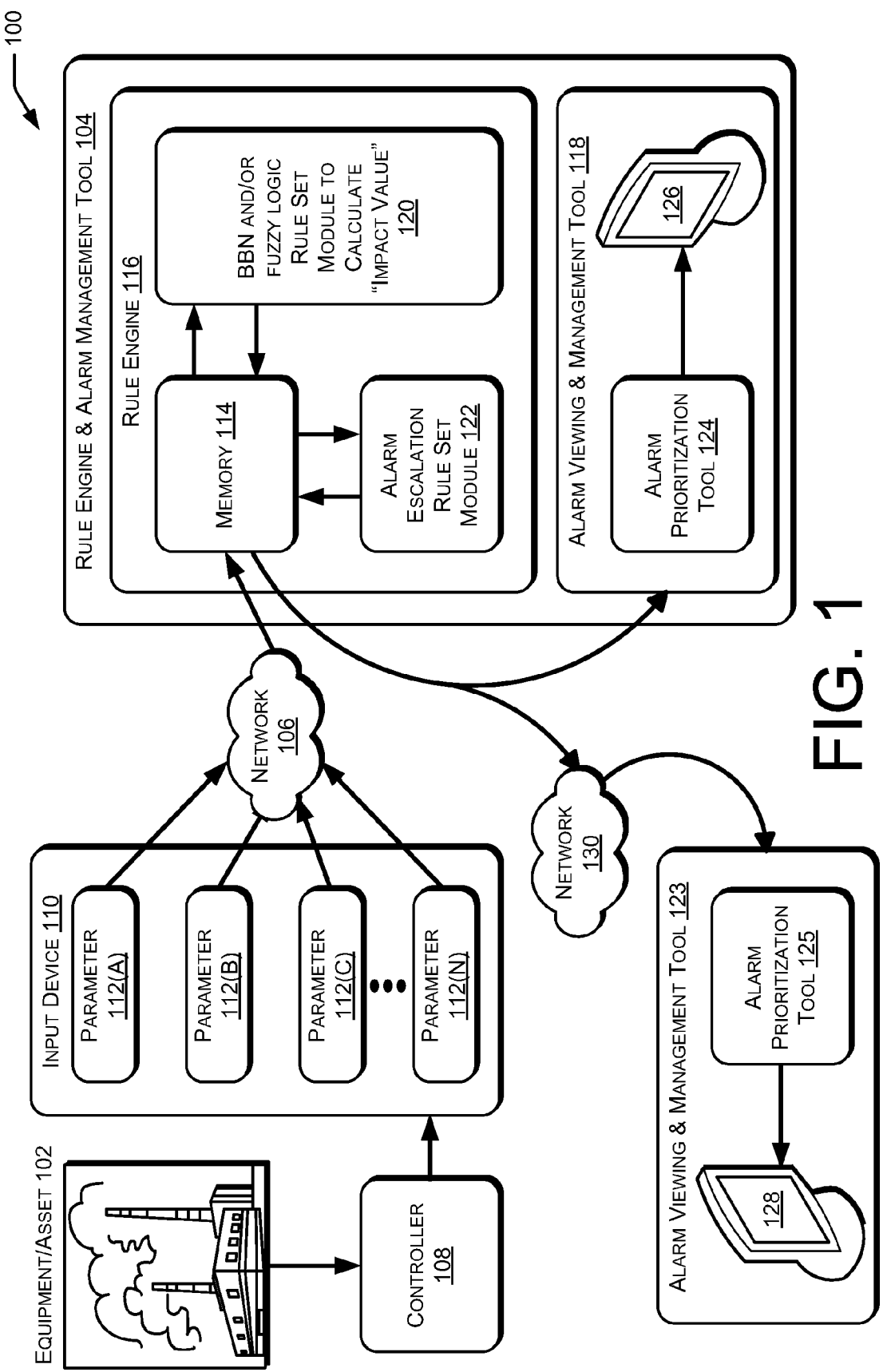
FIG. 1 is a block diagram of an illustrative system for managing alarms of monitored equipment, according to an embodiment of the invention.

FIG. 1 depicts an illustrative architecture 100 in which techniques for alarm management may be implemented. In architecture 100, equipment/assets 102 may be utilized to operate a power plant or other service or facility. In some examples, a rule engine and alarm management tool 104 may be local or remote to the facility, and may be responsible for carrying out some or all of the alarm management functionality described herein. For example, the rule engine and alarm management tool 104 may be indirectly coupled to the equipment/assets 102 via a private or public network like the Internet, such as network 106, or it may be located locally at the power plant.

In some instances, one or more controller(s) 108 may communicate data from the equipment/assets 102 to an input device 110. The controller 108 may be a general purpose controller and/or a one that controls the entire power plant. In other embodiments, each asset 102 that is being monitored may be coupled to its own controller 108. Along with controlling the asset(s) 102, the controller(s) 108 may also monitor (or record values of) the asset(s) 102 at predefined time intervals, such as but not limited, every second, every minute, every 10 minutes, etc. By way of example, each asset 102 may have one or more parameters 112(A), 112(B), ..., 112(N), collectively parameter(s) 112, that are being monitored. As such, a controller 108 may input data pertaining to one or more parameter(s) 112 into the input device 110. The input device 110 may store the respective parameter 112 data or it may transmit this data via network 106 to the memory 114 of the rule engine and alarm management tool 104. In particular, the memory 114 may be computer-readable memory of the rule engine and alarm management tool 104; however, in some instances, it may be dedicated to a rule engine 116.

By way of example only, the rule engine and alarm management tool 104 may include the rule engine 116 and an optional alarm viewing and management tool 118. As noted above, the rule engine 116 may include a memory 114 for storing data of the monitored equipment/assets 102. The rule engine 116 may also include a BBN an/or Fuzzy Logic Rule Set module 120 (hereinafter, "BFRS module 120") and an alarm escalation rule set module 122. In some instances the BFRS module 120 may calculate an "impact value" from the data stored in the memory 114 associated with the equipment/assets 102. By way of example only, the BFRS module 120 may also determine whether the data should be processed using a BBN rule set, a fuzzy logic rule set, or a combination of both.

In some instances, the BFRS module 120 may be configured to collect, extract, or otherwise receive the data from the memory 114 and to remove outliers. Removing outliers may include removing data points that are outside of a particular range, removing data points that deviate from the average by a predetermined amount, or any other method for removing outliers. Further, in one example, the BFRS module 120 may be configured to generate a numerical impact value by creating a directed graph using the BBN model. The BFRS module 120 may also be configured to transmit this impact value back to the memory 114 for storage and further processing.

In other instances, the BFRS module 120 may be configured to remove outliers from the data, as noted above, and then generate a numerical impact value based on fuzzy logic. In other embodiments, the BFRS module 120 may be configured to remove outliers from the data and then generate a numerical impact value by first utilizing the BBN model and then passing it through a fuzzy logic model, or first utilizing a fuzzy logic model followed by a BBN model. In any event, the BFRS module 120 may transmit the results back to the memory 114.

Thus, the memory 114 of the rule engine 116 may store pre-processed data received from the input device 110 and/or post-processed data received from the BFRS module 120. In some instances, the rule engine 116 may then be configured to utilize the alarm escalation rule set module 122 to perform alarm escalation. By way of example only, the alarm escalation rule set module 122 may be configured to escalate and/or filter alarms. That is, the alarm escalation rule set module 122 may be configured to eliminate impact values below a predefined threshold, for example, but not limited to, eliminating impact values below 90, below 80, below 70, etc. In certain aspects, the predefined threshold may be hard-coded into the alarm escalation rule set module 122, while in other aspects, the predefined threshold may be provided by an operator of the equipment 102 and/or the rule engine and alarm management tool 104. Again, the rule engine 116 may be configured to store the results of the alarm escalation in the memory 114.

In some instances, the rule engine 116 may also be configured to transmit the processed data (i.e., the escalated impact value alarms) to an alarm viewing and management tool 118 that is integrated with the rule engine and alarm management tool 104 and/or an alarm viewing and management tool 123 that is remote. As shown in FIG. 1, both alarm viewing and management tools 118 and 123 may each include an alarm prioritization tool, such as tools 122 and 124, and a display device, such as displays 126 and 128. The main distinction between these two alarm viewing and management tools, as seen in FIG. 1, is that tool 118 may be a local tool with a display device directly coupled to the rule engine and alarm management tool 104, while tool 123 may be remote and accessible via a network 130, such as any private or public, wired or wireless network. Further, in some instances, the remote alarm viewing and management tool 123 may be an application of a mobile device, such as, but not limited to, a laptop computer, a cellular phone, a tablet, etc., or it may be an application of a desktop computing device or other non-mobile device that is accessible over network 130. In some aspects, networks 106 and 130 may be the same network, different networks, or separately routable networks within a single network.

Either way, as noted above, an alarm viewing and management tool 118 or 123 may be configured with an alarm prioritization tool, such as tools 124 or 125. Such a tool may be configured to prioritize alarms that have been presented, so that only alarms above a predefined threshold are displayed. Much like the alarm escalation discussed above, this prioritization may be predefined and hard-coded, or may be a setting that is adjustable by an operator of the equipment 102 or a monitoring system. For example, an operator may decide to view all alarms that have been provided by the rule engine 116 (i.e., alarms that have already passed through the BFRS module 120 and the alarm escalation rule set module 122). In other embodiments, the operator may choose to show a subset of the prioritized results, for example, by showing a certain number of top or bottom alarms, a top or bottom percentage of alarms, or some other variation of prioritized results.

The technical effects of certain embodiments of the invention may include determining impact values of alarms that can be escalated (i.e., filtered) and prioritized. By doing so, redundant alarms may be concatenated to reduce the alarm volume and increase productivity of the alarm monitors and/or operators while simultaneously increasing the chances of detecting actual events.

Figure 2:
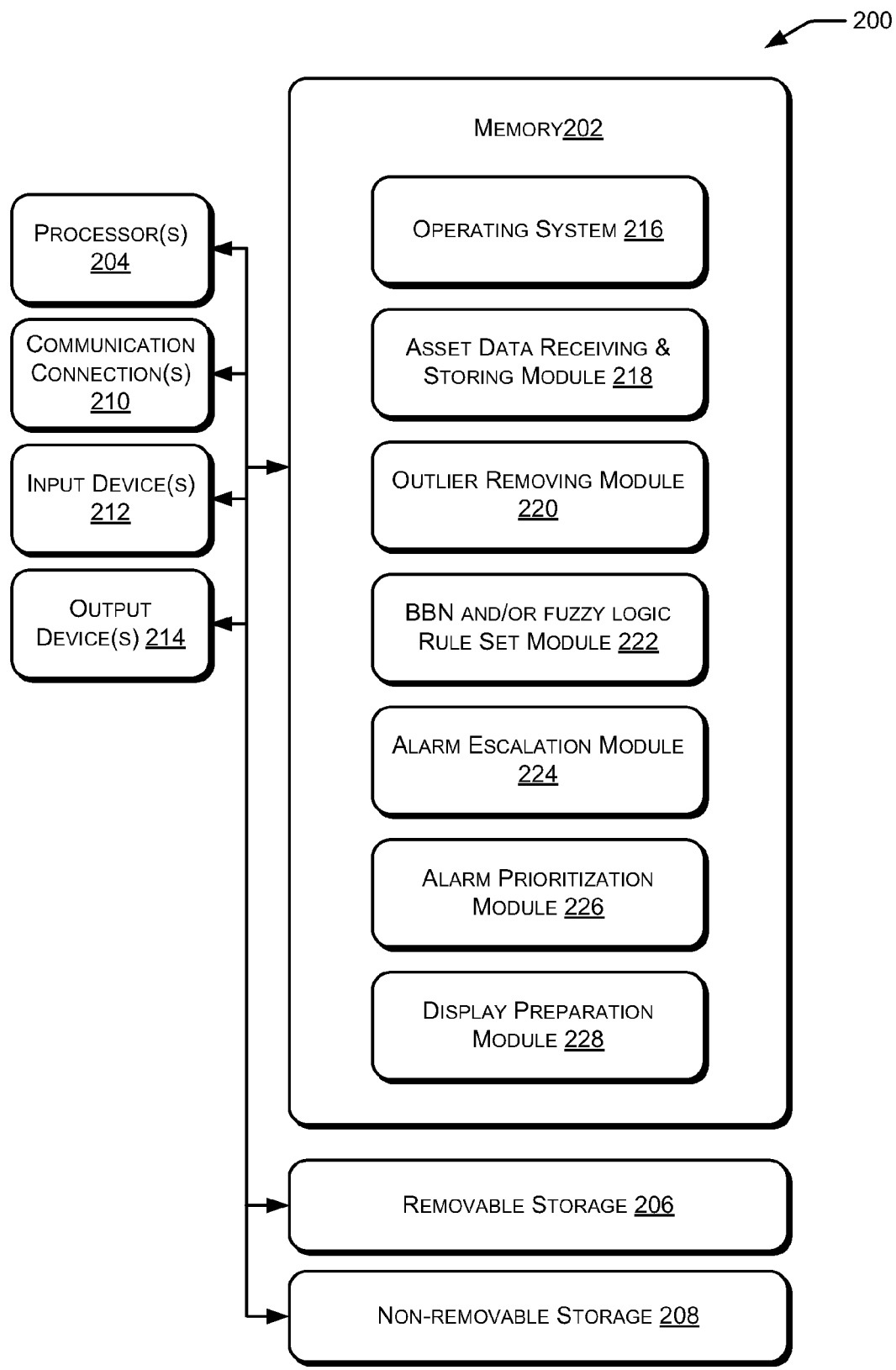
FIG. 2 is a block diagram of an illustrative computing environment showing an illustrative system in which alarm management can be implemented, according to an embodiment of the invention.

FIG. 2 provides an illustrative overview of one computing environment 200, in which aspects of the invention may be implemented. The computing environment 200 may be configured as any suitable computing device capable of implementing alarm management, such as, but not limited to, the rule engine and alarm management tool 104 of FIG. 1. By way of example and not limitation, suitable computing devices may include personal computers (PCs), servers, server farms, data centers, or any other device capable of storing and executing all or part of the illustrative architecture 100.

In one illustrative configuration, the computing environment 200 comprises at least a memory 202 and one or more processing units (or processor(s)) 204. The processor(s) 204 may be implemented as appropriate in hardware, software, firmware, or combinations thereof Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing environment 200, the memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can accessed by the server or other computing device. Combinations of any of the above should also be included within the scope of computer-readable media.

However, in other embodiments, computer-readable communication media may include computer-readable instructions, program modules, or other data transmitted within a data signal, such as a carrier wave, or other transmission. However, as used herein, computer-readable storage media does not include computer-readable communication media.

The computing environment 200 may also contain communication connection(s) 210 that allow the computing environment 200 to communicate with a stored database, another computing device or server, user terminals, and/or other devices on a network, such as the equipment 102, the input device 110, the rule engine and alarm management tool 104, and/or remote devices of FIG. 1.

The computing environment 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the features disclosed herein including an asset data receiving and storing module 218. The asset data receiving and storing module 218 may be configured to receive asset data from the equipment/assets 102 and store the data. However, in some aspects, this module 218 may be receive the data and not store it. With reference to FIG. 1, the asset data receiving and storing module 218 may implemented as part of the input device 110 and/or the rule engine 116 of the rule engine and alarm management tool 104.

The memory 202 may also include an outlier removing module 220. The outlier removing module 220 may be configured to remove outliers from the received and/or stored data in order to eliminate false alarms and/or anomalous data. Further, in some aspects, the outlier removing module 220 may be implemented by the rule engine 116. Additionally, the memory 202 may include a BBN and/or fuzzy logic module 222 and an alarm escalation module 224. In some aspects, the BBN and/or fuzzy logic module 222 may be configured to operate similar to the BFRS module 120 of FIG. 1. In that way, the BBN and/or fuzzy logic module 222 may be configured to determine whether to use a BBN rule set, a fuzzy logic rule set, or a combination of the two to calculate impact values. Additionally, the BBN and/or fuzzy logic module 222 may perform the calculation and store the results (i.e., one or more impact values) into a computer-readable storage device, such as, but not limited to, memory 114 of FIG. 1. Additionally, in some aspects, the alarm escalation module 224 may be configured to operate similar to the alarm escalation rule set module 122 of FIG. 1. As such, the alarm escalation module 224 eliminates, or filters out, impact values above certain thresholds and stores the filtered data into the memory 114, or another computer-readable storage device.

Further, the memory 202 may include an alarm prioritization module 226 and a display preparation module 228. In some aspects, the alarm prioritization module 226 may prioritize the filtered impact values stored in the memory 114. In this way, false alarms that managed to remain in the data may be dropped to the bottom of the list of impact values. Additionally, this may provide an operator or monitor the ability to view a subset of the impact values. Additionally, in some aspects, the display preparation module 228 may prepare the results for display to an operator or monitor of the equipment 102. Preparation of the results may include converting the data into a displayable format, creating or populating a user interface so the results can be displayed, transmitting the results to a display device, and/or rendering the results on a screen of a display device.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing environment 200 shown in FIGS. 1 and 2 are provided by way of example only. Numerous other operating environments, system architectures, and device configurations are possible. For example, while four parameters, 112(A)-(N) are shown in FIG. 1, any number of parameters for each piece of equipment 102 may be monitored and/or recorded. Additionally, while the illustrative architecture 100 is described in FIG. 1 with reference to alarm management of equipment/assets of a power plant, the system and methods described herein may be implemented to manage alarms for equipment/assets of any type of facility or industry, such as, but not limited to, aviation equipment, aircraft manufacturing plants, health management equipment, etc. Accordingly, embodiments of the present invention should not be construed as being limited to any particular operating environment, system architecture, or device configuration.

Figure 3:
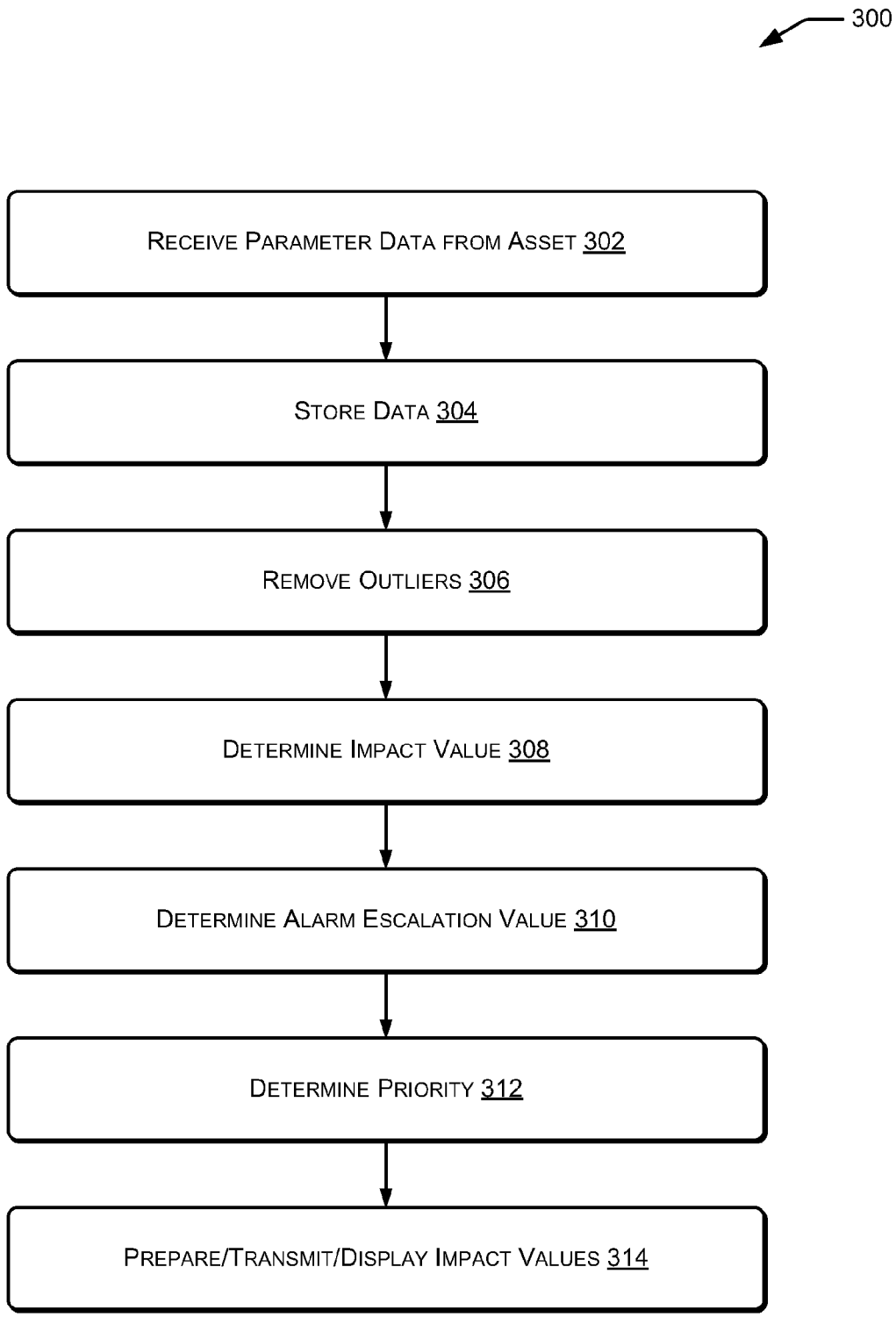
FIG. 3 is a flow diagram illustrating details of alarm management, according to an embodiment of the invention.

FIG. 3 is a flow diagram of an illustrative process 300 for implementing alarm management, as described with reference to FIGS. 1 and 2. In one example, the illustrative rule engine and alarm management tool 104 may perform any or all of the operations of the process 300. This process is illustrated as a logical flow diagram, where each operation represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive parameter data from equipment or assets that are being monitored and store the received data in a computer-readable media at block 304. In some aspects, the data may be received by an application of a computing device, such as rule engine 116, and may be stored in a memory location, such as memory 114. At block 306, the process 300 may remove outliers from the stored data by running a linear regression or other algorithm on the data and then deleting anomalous data points. The process may then, at block 308, determine an impact value for the received data. As noted above, determining an impact value may include processing the data using a BBN rule set, a fuzzy logic rule set, or a combination of the two.

At block 310, the process 300 may determine an alarm escalation value. As noted above, an alarm escalation value may be a threshold value, below which all alarms may be ignored. In some aspects, the alarm escalation value may be hard-coded by a provider of the process 300 or may be selected and/or received by an operator of the process 300. At block 312, the process 300 may determine a priority for the impact values and at block 314, the process 300 may prepare the results (i.e., impact values) for display, transmit the results to be displayed, and/or display the results to an operator or monitor of the equipment/assets.

Illustrative systems and methods of alarm management are described above. Some or all of these systems and methods may, but need not, be implemented at least partially by an architecture such as that shown in FIGS. 1 and/or 2. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

The claimed invention is:

1. A system, comprising:
   at least one memory that stores computer-executable instructions;
   at least one processor configured to access the at least one memory, wherein the at least one processor is configured to execute the computer-executable instructions to:
      receive, from an asset, data associated with a parameter of the asset and store the data in memory;
      determine an impact value for the parameter based at least in part on a rule set, wherein the impact value is a numeric value associated with the asset determined based at least in part on a Bayesian belief network (BBN) rule set, a fuzzy logic rule set, or a combination thereof;
      analyze the impact value based at least in part on an escalation value rule set; and
      in response to analyzing the impact value, prepare the impact value for presentation.

2. The system of claim 1, wherein the asset is monitored and the data associated with the asset is collected via the monitoring at predefined intervals.

3. The system of claim 1, wherein the at least one processor is further configured to execute the computer-executable instructions to remove an outlier from the data associated with the parameter of the asset.

4. The system of claim 1, wherein the rule set is the Bayesian belief network (BBN) rule set or the fuzzy logic rule set.

5. The system of claim 1, wherein the at least one processor is further configured to execute the computer-executable instructions to determine an alarm escalation value for eliminating impact values below a predefined threshold.

6. The system of claim 5, wherein the determination of the alarm escalation value comprises receipt, from an operator or monitor of the asset, of an alarm escalation rule.

7. The system of claim 6, wherein the alarm escalation rule provides the predefined threshold.

8. The system of claim 7, wherein impact values above the predefined threshold are prepared for presentation.

9. The system of claim 1, wherein the preparation of the impact value for presentation comprises prioritizing the impact value in relation to other impact values determined for other parameters of the asset.

10. A method, comprising:
    receiving, from an asset, data associated with a parameter of the asset and storing the data in memory;
    determining an impact value for the parameter based at least in part on a rule set, wherein the impact value is a numeric value associated with the asset determined based at least in part on a Bayesian belief network (BBN) rule set, a fuzzy logic rule set, or a combination thereof;
    analyzing the impact value based at least in part on an escalation value rule set; and
    in response to analyzing the impact value, preparing the impact value for presentation.

11. The method of claim 10, wherein the asset is monitored and the data associated with the asset is collected at predefined intervals.

12. The method of claim 10, further comprising removing an outlier from the data associated with the parameter of the asset.

13. The method of claim 10, wherein the rule set is the Bayesian belief network (BBN) rule set or the fuzzy logic rule set.

14. The method of claim 10, further comprising determining an alarm escalation value for eliminating impact values below a predefined threshold.

15. The method of claim 14, wherein determining the alarm escalation value comprises receiving, from an operator or monitor of the asset, an alarm escalation rule.

16. The method of claim 15, wherein the alarm escalation rule provides the predefined threshold.

17. The method of claim 16, wherein impact values above the predefined threshold are prepared for presentation.

18. The method of claim 10, wherein preparing the impact value for presentation comprises prioritizing the impact value in relation to other impact values determined for other parameters of the asset.

19. One or more computer-readable media storing computer-executable instructions that, when executed by at least one processor, configure the at least one processor to perform operations comprising:

receiving, from an asset, data associated with a parameter of the asset and storing the data in memory;

removing an outlier from the data associated with the parameter of the asset;

determining an impact value for the parameter based at least in part on a rule set, wherein the impact value is a numeric value associated with the asset determined based at least in part on a Bayesian belief network (BBN) rule set, a fuzzy logic rule set, or a combination thereof;

determining an alarm escalation value for eliminating impact values below a predefined threshold based at least in part on an escalation value rule set; and in response to determining the alarm escalation value, preparing the impact value for presentation.

20. The one or more computer-readable media of claim 19, wherein the rule set is the Bayesian belief network (BBN) rule set or the fuzzy logic rule set.

\* \* \* \* \*